United States Patent [19]
Pickett et al.

[11] 3,871,232
[45] Mar. 18, 1975

[54] THERMOMETER CONSTRUCTION

[75] Inventors: Charles G. Pickett, Andover; Ghazi Khattab, Parsippany, both of N.J.

[73] Assignee: Bio-Medical Sciences, Inc., Fairfield, N.J.

[22] Filed: Oct. 15, 1973

[21] Appl. No.: 406,146

Related U.S. Application Data

[63] Continuation-in-part of Ser. No. 300,868, Oct. 25, 1972, abandoned.

[52] U.S. Cl. .................... 73/356, 73/358, 116/114.5
[51] Int. Cl. ...................... G01k 11/12, G01k 11/08
[58] Field of Search ............ 73/356, 358, 340, 342, 73/341

[56] References Cited
UNITED STATES PATENTS

| | | | |
|---|---|---|---|
| 2,900,820 | 8/1959 | Serafin | 73/342 |
| 3,465,590 | 9/1969 | Kluth | 73/356 |
| 3,665,770 | 5/1972 | Sagi | 73/356 |
| 3,677,088 | 7/1972 | Lang | 73/358 |
| 3,704,985 | 12/1972 | Pickett | 73/358 |

*Primary Examiner*—Richard C. Queisser
*Assistant Examiner*—Denis F. Corb
*Attorney, Agent, or Firm*—Bruce M. Collins

[57] ABSTRACT

The individual indicators in a disposable thermometer are arranged in a grid pattern in rows parallel to the longitudinal axis of the thermometer with the indicators corresponding to the lowest temperature in any row being closest to the handle end of the thermometer. Heat responsive materials associated with the indicators are then compounded so that the temperature increment in melting points between any adjacent heat responsive materials is greater than the increment shown by indicia associated with the indicators.

4 Claims, 3 Drawing Figures

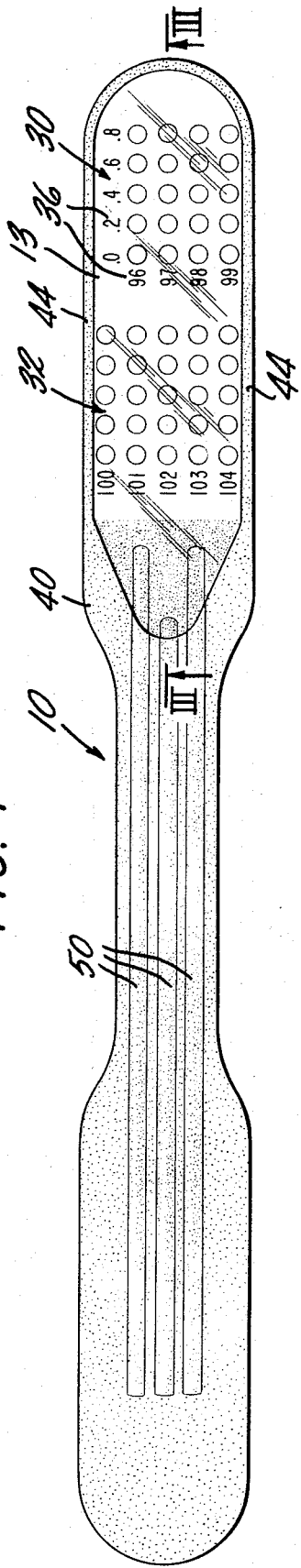
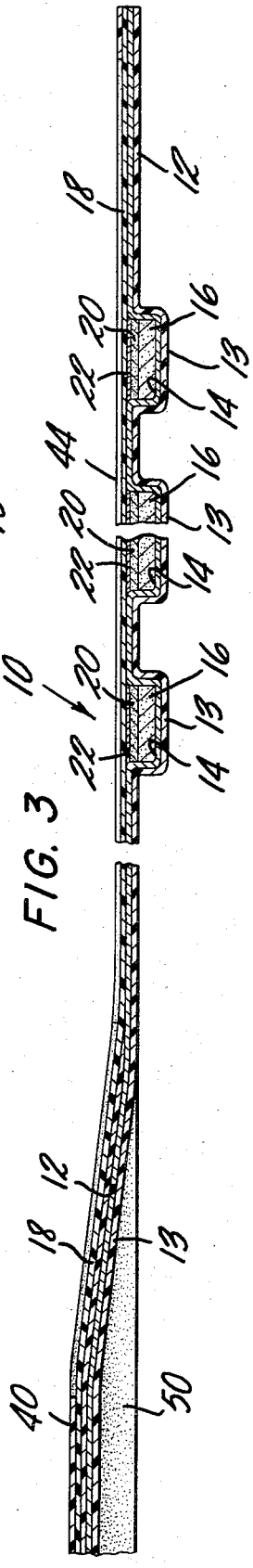
FIG. 1
FIG. 2
FIG. 3

THERMOMETER CONSTRUCTION

CROSS-REFERENCE

This is a continuation-in-part of Ser. No. 300,868 filed Oct. 25, 1972, now abandoned.

Disposable clinical thermometers of various types are known in the art. One such class includes the thermometers disclosed in U.S. Pat. Nos. 3,665,770, 3,677,088, and 3,704,985. These thermometers are elongated articles having a handle end and a measuring end. The functioning part of the measuring end includes a carrier such as aluminum foil in which is formed a plurality of cavities. The cavities contain solid solutions of the same two organic compounds but in varying composition ratios. The compounds are selected so that their solid solutions demonstrate an essentially linear melting point-to-composition ratio over the range represented by the varied compositions. Consequently, the solid solution in each cavity melts at a temperature different from that in any other cavity. Indicator means are associated with each cavity to visually signal melting of the solid solution within that cavity. Various other features not pertinent to the present invention can also be present.

For clinical purposes, the thermometers can be designed to measure from about 96°F (about 35.5°C) to about 105°F (about 40.5°C). This range is usually divided into a progression of like temperature increments. For the Fahrenheit scale, for example, a 0.2°F increment is convenient. A slightly different increment, for example, 0.1°C can be employed for the Centigrade scale. Thus, the composition of the solid solution in each cavity, of which there may be from forty to fifty, differs from that in an adjacent cavity to the extent necessary to result in a difference in melting point corresponding to this increment. Indicia reflecting this progression are then provided on the thermometer in order to correlate the indicators associated with these cavities and the temperature at which the solid solutions contained therein will melt.

The actual arrangement of the cavities and indicators on the thermometer has previously been largely a matter of convenience. Thus, the arrangements of the cavities has been determined by ease of reading, available space and the configuration of the thermometer, the latter in turn being determined by comfort. A convenient arrangement included a series of cavities arranged in rows so as to correspond to a grid. Each row corresponding to a different temperature range, e.g., one degree, and each cavity in that row corresponding to an increment of a fraction of that range. It has never been considered that the arrangement of the cavities on the thermometer had a bearing on the accuracy and precision of the thermometer and that certain arrangements could be advantageously utilized to maximize both accuracy and precision.

It has been discovered, however, that there is a temperature gradient in the human mouth. Thus, a somewhat higher temperature is observed in the inner mouth region than towards the mouth opening. This gradient, on the average, is about 0.8°F (about 0.4°C) for most humans.

As a result of this gradient, the effective temperature registered by those portions of the thermometer closer to the handle portion and this closer to the mouth opening is lower than the actual body temperature. This difference between actual body temperature and measured temperature increases towards the handle end, relative to the measuring end of the thermometer. This gradient can thus create serious problems in accuracy since the positioning of a cavity on the thermometer in an area where the temperature difference is great can result in a failure of the solid solution to melt at its intended temperature.

The present invention, however, advantageously makes use of this gradient to improve the accuracy and precision of the thermometer, as will be seen from the following description and the accompanying drawings in which:

FIG. 1 is a plan view of a disposable oral thermometer;

FIG. 2 is a side elevation view of FIG. 1; and

FIG. 3 is a sectional view in enlarged scale taken along line III—III in FIG. 1.

Referring now to the Figures, thermometer 10 has an elongated flat carrier sheet 12. Carrier sheet 12 is formed from a good thermally conducting material such as aluminum foil. The carrier sheet is disposed on the thermometer end opposite the handle end and forms the temperature measuring end of the thermometer. A plurality of cavities 14 are shaped in the carrier sheet 12. Each cavity contains a solid solution of the same two organic compounds in various composition ratios. The organic compounds are those whose solid solutions demonstrate an essentially linear melting point-to-composition relationship over the composition range represented by the compositions of the solid solutions. The cavities 14 are associated with an indicator system which includes a dyestuff 20 and an acceptor 22 of absorbent material. This indicator signals the melting of the solid solution in the carrier. Thus, the liquified solid solution carries the dyestuff 20 into acceptor 22 so as to produce a visual (color) change. Each cavity 14 has its own indicator in registration above it. The cavities 14 and associated indicators are spaced in a series of rows parallel to the longitudinal axis of the thermometer in a grid arrangement with each indicator corresponding to a point on the grid. Indicia 36 are associated with the indicators so that each row indicates a different temperature range and all points or cavities in the row indicates a fixed progression of like temperature increments within that range.

One face of the carrier sheet is covered with a film 13 of polymeric material such as polyester. A second film of polymeric material 18 overlies the other face of the thermometer. The thermometer can also include layer 40 of resilient material overlaying sheet 12 and film 18 in order to give the outer surface of the thermometer a soft texture. The thermometer's structure can include a rib 50 in order to provide rigidity.

In the present invention, each of the cavities 14 and the solid solution deposits 16 are arranged in an optimum pattern on the thermometer measuring portion. In this pattern, the cavities are arranged in rows along the longitudinal axis of the thermometer. Conveniently, the rows of cavities can be arranged in two groups. The group associated with a lower temperature value is positioned more distantly from the thermometer handle while the group associated with higher temperature values is positioned nearer to the thermometer handle. The temperature scale utilized (Centigrade or Fahrenheit) and the desired range of measurement will determine the exact placement and number of rows. The following discussion deals with a thermometer which would be manufactured for use in a country utilizing the Fahrenheit scale, but the theoretical considerations are the same regardless of the scale or temperature range.

Thus, the first group of rows 30 is associated with indicia showing temperature values from 96.0°F through 99.8°F. The second group of rows 32 is associated with indicia reflecting temperature values from 100.0°F through 104.8°F.

The arrangement of the cavities in each row is such that the indicia for the cavity which is closest to the handle end of the thermometer is associated with the lowest temperature value of that row. The indicia for the cavity which is most distant from the handle end of the thermometer is associated with the highest temperature value of that row.

Thus, the cavities closest to the handle end in each of the respective rows of the first group are associated with indicia showing values of 96.0°, 97.0°, 98.0° and 99.0°F, respectively. The second cavities in the rows of the first group are associated with indicia showing temperature values of 96.2°, 97.2°, 98.2° and 99.2°F, respectively. The last or fifth cavities in the rows of the first group are associated with indicia showing temperature values of 96.8°, 97.8°, 98.8° and 99.8°F, respectively. A similar relationship exists with the indicia associated with the other cavities in the rows of the second group.

It will thus be seen that within either group of rows, the progression of temperature indicia for each row decreases towards the handle end of the thermometer by a fixed increment. In the example given, the fixed increment is 0.2°F but other increments can, of course, be selected such as 0.1°C, 0.1°F, etc. The temperature gradient within the mouth, however, also contributes a further increment in the same direction, i.e., the actual temperature decreases toward the mouth opening, or the handle end of the thermometer. As a result, it is possible to compound the solid solutions in any two adjacent cavities so that the resultant melting points differ by more than the difference between the indicia values associated with those cavities. The difference in melting points for two such solid solutions can be from about 20 to about 30 percent higher than the temperature increment between the specific value depending upon the spacing of the cavities in relation to their eventual positioning within the mouth indicia associated with those cavities. For the example shown in which the increment is 0.2°F, the melting points of the solid solutions can thus differ by about 0.25°F. If the indicia shows increments of 0.1°C, the solid solutions can be formulated to melt in increments of from about 0.12° to about 0.13°C.

For various other reasons, the actual melting point of any solid solution is lower by about 1°F than the temperature shown by the associated indicia. Hence, even under ideal conditions, the melting point of the solid solution utilized to show a melting point of 96°F (35.6°C) would actually be about 95°F (35°C). This is the base upon which the increments are utilized. The following table reflects the indicia of two rows (96.0°–96.8°F and 97.0°–97.8°F) in a thermometer such as that of FIG. 1 and typical solid solutions utilized to produce an accurate visual signaling of the indicators associated with these indicia.

| Row | Indicia Temperature | Indicia Increment | Solid Solution m.p. | Melting Point Increment |
| --- | --- | --- | --- | --- |
|  | 96.0°F | — | 95.00°F | — |
|  | 96.2° | 0.2° | 95.25° | 0.25° |
| 1 | 96.4° | 0.2° | 95.49° | 0.24° |
|  | 96.6° | 0.2° | 95.76° | 0.27° |
|  | 96.8° | 0.2° | 95.99° | 0.23° |
|  | 97.0° | — | 95.99° | — |
|  | 97.2° | 0.2° | 96.21° | 0.22° |
| 2 | 97.4° | 0.2° | 96.51° | 0.30° |
|  | 97.6° | 0.2° | 96.75° | 0.24° |
|  | 97.8° | 0.2° | 97.00° | 0.25° |

A similar relationship between melting point increment and indicia increment is utilized with the remaining rows.

A further advantageous consequence of this invention can also be seen from the table on page 7. When designing the thermometer as shown so that each row reflects 1°F, it is possible to use the same solid solution in the last cavity of a row (most distance from the thermometer handle end and, thus, the highest value in that row) in the first cavity of the adjacent row reflecting the next higher degree.

Thus, for example, the solid solution utilized to show an indicia temperature of 96.8°F in the last cavity of the first row has an actual melting point of 95.99°F. When utilized in the first cavity of the next adjacent higher temperature (97°–97.8°F), this same solid solution will show an indicia melting point of 97.0°F, even though its actual melting point is still 95.99°F. Hence, for a thermometer having 45 cavities arranged in 9 rows of 5 each, one need only prepare 37 different solid solutions rather than 45. If a thermometer had 10 rows of five cavities each, one would need only 41 solid solutions rather than 50.

We claim:
1. In an elongated oral thermometer having
   a handle end and a measuring end, the measuring end including a heat conducting carrier in which a plurality of cavities are defined with solid solutions of the same two organic compounds in various composition ratios deposited in the cavities, the solid solutions having an essentially linear melting point-to-composition relationship over the composition range represented by the plurality of solutions,
   an indicator associated with each cavity to visually signal the melting of solid solution in that cavity, the cavities and associated indicators being spaced in a series of rows parallel to the longitudinal axis of the thermometer in a grid arrangement with each indicator corresponding to a point on the grid, and
   such temperature indicia associated with the indicators that each row indicates a different temperature range and all points in a row denote a regular progression of like temperature increments within that range,
   the improvement comprising the disposition of the highest temperature indicia for any given row being towards the measuring end of the thermometer and the lowest temperature indicia for the same row towards the handle end of the thermometer the various composition ratios for the solid solutions being such that the difference in the melting points of solid solutions in any two adjacent cavities in the same row is greater than the temperature increment shown by the indicia associated with those two adjacent cavities.

2. A thermometer as defined in claim 1 in which the composition ratios of the solid solutions are such that the difference in melting points between the solid solutions in any two adjacent cavities is from 20 to 30 percent greater than the temperature increment shown by the indicia for those cavities and their associated indicator.

3. A thermometer as defined in claim 1 in which the cavities and associated indicators are disposed along the longitudinal axis of the thermometer in two groups of rows, each group having at least one row adjacent to one longitudinal margin of the carrier with any remaining rows of that group being disposed in parallel spacing across the carrier towards the other margin, the group of rows disposed closer to the handle end of the thermometer being associated with higher temperature indicia than the group disposed more distant from the handle end.

4. A thermometer as defined in claim 3 wherein the increment between the indicia associated with any two adjacent indicators in any one row is 0.2°F and the solid solutions deposited in the cavities associated with those indicators have composition ratios such that the difference in their melting points is 20 to 30% greater than said increment.

* * * * *